(12) United States Patent
Alberti et al.

(10) Patent No.: US 11,606,509 B2
(45) Date of Patent: Mar. 14, 2023

(54) CAMERA SYSTEM AND METHOD FOR MONITORING AN INSTALLATION, IN PARTICULAR SWITCHGEAR

(71) Applicant: SIEMENS AKTIENGESELLSCHAFT, Munich (DE)

(72) Inventors: Nicolas Alberti, Bad Homburg (DE); Erhard Aumann, Worms (DE); Thomas Hild, Frankfurt Am Main (DE)

(73) Assignee: Siemens Aktiengesellschaft, Munich (DE)

( * ) Notice: Subject to any disclaimer, the term of this patent is extended or adjusted under 35 U.S.C. 154(b) by 128 days.

(21) Appl. No.: 17/218,840

(22) Filed: Mar. 31, 2021

(65) Prior Publication Data

US 2021/0306575 A1 Sep. 30, 2021

(30) Foreign Application Priority Data

Mar. 31, 2020 (DE) .......................... 102020204190.3

(51) Int. Cl.
| | |
|---|---|
| H04N 5/268 | (2006.01) |
| H04N 7/18 | (2006.01) |
| H04N 5/232 | (2006.01) |
| H02J 13/00 | (2006.01) |
| H04N 5/247 | (2006.01) |
| H04N 7/10 | (2006.01) |

(52) U.S. Cl.
CPC ....... *H04N 5/268* (2013.01); *H02J 13/00002* (2020.01); *H04N 5/23203* (2013.01); *H04N 5/23241* (2013.01); *H04N 5/247* (2013.01); *H04N 7/10* (2013.01); *H04N 7/181* (2013.01)

(58) Field of Classification Search
None
See application file for complete search history.

(56) References Cited

U.S. PATENT DOCUMENTS

| | | | |
|---|---|---|---|
| 10,341,540 B2 | 7/2019 | Huempfner | |
| 2009/0223128 A1 | 9/2009 | Kuschak | |
| 2018/0278813 A1* | 9/2018 | Huempfner | .......... H01H 1/0015 |
| 2019/0260204 A1 | 8/2019 | Koval | |

FOREIGN PATENT DOCUMENTS

| | | | | |
|---|---|---|---|---|
| DE | 102015218645 B3 * | 2/2017 | ............. | G03B 17/08 |
| DE | 102015218645 B3 | 2/2017 | | |
| EP | 2779641 A2 | 9/2014 | | |

OTHER PUBLICATIONS

"Zoom: Q2n-4K Handy Video Recorder", Operation Manual, Zoom Corporation. 2018 (Year: 2018).*
Zoom: Q2n Handy Video Recorder—Operation Manual.Corporate Font Z21-2813-01. Tokyo, Japan: Zoom Corporation, 2016.

* cited by examiner

*Primary Examiner* — James M Anderson, II
(74) *Attorney, Agent, or Firm* — Laurence A. Greenberg; Werner H. Stemer; Ralph E. Locher

(57) ABSTRACT

A camera system for monitoring an installation, in particular switchgear, has at least one camera, a display device, a switchover device and a power supply which, in an active state, supplies the camera with power via the switchover device. The switchover device is configured to transmit an image signal from the camera automatically to either the display device or to an interface to which a computer can be connected. There is also described a method for monitoring an installation, in particular switchgear, by way of the camera system.

18 Claims, 3 Drawing Sheets

CAMERA SYSTEM AND METHOD FOR MONITORING AN INSTALLATION, IN PARTICULAR SWITCHGEAR

CROSS-REFERENCE TO RELATED APPLICATION

This application claims the priority, under 35 U.S.C. § 119, of German patent application DE 10 2020 204 190.3, filed Mar. 31, 2020; the prior application is herewith incorporated by reference in its entirety.

BACKGROUND OF THE INVENTION

Field of the Invention

The present invention relates to a camera system to monitor an installation, in particular switchgear, and a method for monitoring an installation, in particular switchgear, by means of a camera system.

Gas-insulated switchgear can be provided with a camera system, for example a "Visual Disconnect Monitoring System" (VDMS), for monitoring the isolating spacing distance. There are, in principle, two alternative designs. In one variant, as described in commonly assigned U.S. Pat. No. 10,341,540 B2 and its counterpart German patent DE 10 2015 218 645 B3, for example, the connection of the camera system is routed via a Y-cable to the front of the installation and enables direct connection via a USB and RJ45 cable to a PC, wherein the USB cable is used for the power supply by means of 5V from the PC and the network cable is used for data transmission.

In an alternative variant, the camera system is installed together with a panel of a human-machine interface (HMI). The required camera of the camera system can be started up by means of illuminated pushbuttons on the front of the installation or on the HMI, and the required camera image then appears on the HMI panel. However, the simultaneous connection of a PC is not possible, and for this reason no connections are located on the front of the installation. In this variant, the camera system is supplied with 12 V from a power supply unit.

However, it must be possible to connect a PC for emergency operation if the supply voltage fails. Generally speaking, even if a display device is installed (e.g. in the form of an HMI panel), the facility should be provided to connect a PC simultaneously via connections on the front of the installation and to be able to access the camera system with the PC.

BRIEF SUMMARY OF THE INVENTION

It is accordingly an object of the invention to provide a monitoring system and method which overcome the above-mentioned disadvantages of the heretofore-known devices and methods of this general type and which provide for a system for monitoring an installation, in particular switchgear, and for a method for monitoring an installation, in particular switchgear, by means of a camera system With the above and other objects in view there is provided, in accordance with the invention, a camera system for monitoring an installation, in particular for monitoring switchgear. The camera system according to the invention comprises:

a camera configured to generate an image signal;
a display device;
a switchover device connected via a first interface to the camera for receiving the image signal from the camera and connected via a second interface to the display device for transmitting the image signal to the display device;
a third interface is configured for connecting the switchover device to a computer and, in an active state thereof, to transmit the image signal from the switchover device to the computer, and to provide a first power supply from the computer via the switchover device to the camera; and
a second power supply which, in an active state thereof, supplies the camera with power via the switchover device;
the switchover device being configured to assume a first switching state a), a second switching state b), and a third switching state c), wherein:
the switchover device is configured to effect the first switching state a) if the first power supply is inactive and the second power supply is active, wherein, in the first switching state a), the image signal received from the camera via the first interface is transmitted via the second interface to the display device, but not to the third interface, and the display device displays an image defined by the image signal;
the switchover device is configured to effect the second switching state b) if the first power supply is active and the second power supply is inactive, wherein, in the second switching state b), the image signal received from the camera via the first interface is transmitted to the third interface, but not via the second interface to the display device; and
the switchover device is configured to effect the third switching state c) if both the first power supply and the second power supply are active, wherein, in the third switching state c), the image signal received from the camera via the first interface is transmitted to the third interface, but not via the second interface to the display device, and the camera is still supplied with power via the switchover device from the second power supply but not by the first power supply.

In other words, a first aspect of the invention relates to a camera system to monitor an installation, in particular switchgear, having: at least one camera which generates an image signal; a display device; a switchover device which is connected via a first interface to the camera in order to receive the image signal from the camera and which is connected via a second interface to the display device in order to transmit the image signal to the display device; a third interface which is configured to connect the switchover device to a computer, wherein the third interface is configured, in the active state, to transmit the image signal from the switchover device to the computer and to configure a first power supply from the computer via the switchover device to the camera; and a second power supply which, in the active state, supplies the camera and, if necessary, the display device with power via the switchover device.

In the context of the present invention, the term "active" can mean, for an interface, that the switchover device transmits signals to the interface. In the context of the present invention, the term "inactive" can mean, for an interface, that the switchover device transmits no signals to the interface. With regard to the third interface, the active state can mean that the computer is connected to the third interface and is capable of providing the first power supply.

In the context of the present invention, the term "active" can mean, for a power supply, that the power supply is operating and/or is feeding power to a consumer. In the context of the present invention, the term "inactive" can mean, for a power supply, that the power supply is not operating and/or is not feeding power to a consumer.

The switchover device is configured to effect at least a first switching state a), a second switching state b), and a third switching state c).

The switchover device is configured to effect the first switching state a) if the first power supply is inactive and the second power supply is active, wherein, in the first switching state a), the image signal received from the camera via the first interface is transmitted via the second interface to the display device, but not to the third interface, wherein the display device displays an image defined by the image signal.

The switchover device is configured to effect the second switching state b) if the first power supply is active and the second power supply is inactive, wherein, in the second switching state b), the image signal received from the camera via the first interface is transmitted to the third interface, but not via the second interface to the display device.

The switchover device is configured to effect the third switching state c) if both the first and the second power supply are active, wherein, in the third switching state c), the image signal received from the camera via the first interface is transmitted to the third interface, but not via the second interface to the display device, wherein the camera is still supplied with power via the switchover device by the second power supply, but not by the first power supply.

The ergonomics and the application security of the entire camera system can advantageously be improved. Whereas, in existing solutions for emergency operation (if the second power supply fails), the installation needs to be opened and, if necessary, a manual switchover performed, this is completely eliminated by the invention which effects an automatic switchover by means of the switchover device. It is now possible to connect a computer to the front of the installation and access the camera at any time, even if an HMI panel is installed, since an automatic switchover is performed.

Since the installations are in some cases secured with locks and cannot be opened, the present invention can avoid this problem and is therefore more efficient and increases customer satisfaction at similar costs compared with existing solutions.

In one exemplary embodiment, the switchover device has a first relay device which is actuated by a logic circuit and transmits the image signal from the first interface to either the second or the third interface, and a second relay device which initiates a power supply of the camera from either the first or the second power supply.

The logic circuit detects whether the first power supply and the second power supply are active or not.

The logic circuit is configured to cause the first relay device to transmit the image signal from the first interface to the second interface, but not to the third interface if the logic circuit detects that the first power supply is inactive and the second power supply is active (switching state a)).

The logic circuit is configured to cause the first relay device to transmit the image signal from the first interface to the third interface, but not to the second interface if the logic circuit detects that the first power supply is active (switching state b)).

The second relay device supplies the camera with power via the second power supply and not via the first power supply if it is energized by the active, second power supply (switching states a) and c)).

The second relay device initiates a power supply of the camera via the first power supply and not via the second power supply if it is not energized by the inactive, second power supply (switching state b)).

In one embodiment, the first interface and the third interface are in each case an RJ45 interface for transmitting the image signal with integrated power supply lines for the first power supply.

In one exemplary embodiment, the third interface has a USB stream, an RJ45 data stream and a combined RJ45 stream in which lines of the USB stream and the RJ45 data stream are combined. The third interface is preferably a Y-cable.

In one exemplary embodiment, the second interface is an RJ45 interface for transmitting the image signal.

In one exemplary embodiment, the first power supply has a rated voltage of 5 V, and/or the second power supply has a rated voltage of 12 V.

In one exemplary embodiment, the camera system further has a panel which is configured for attachment to a housing of the installation, wherein the panel has a socket (for example RJ45) as part of the third interface and an illuminated pushbutton/illuminated switch to switch the camera on and off. Furthermore, the camera system preferably has a plurality of cameras and a plurality of panels, wherein respective illuminated pushbuttons of the panels are configured to uniquely identify or display an associated camera.

In one exemplary embodiment, the camera system further has a third power supply which, instead of the first power supply, can comprise an alternative 5V voltage source, preferably a power bank, a charging device or tablet.

In one exemplary embodiment, the camera system further has a human-machine interface or a second computer which has the display device.

In one exemplary embodiment, the camera system further has the display device in the form of a computer which belongs to a control station which is preferably located relatively far away from the switchgear.

With the above and other objects in view there is provided, in accordance with the invention, a second aspect of the invention which relates to a method for monitoring an installation, in particular switchgear, by means of a camera system having at least one camera which generates an image signal; a display device; a switchover device which is connected via a first interface to the camera in order to receive the image signal, in particular a video signal, from the camera and which is connected via a second interface to the display device in order to transmit the image signal to the display device; a third interface which is configured to connect the switchover device to a computer, wherein the third interface is configured, in the active state, to transmit the image signal from the switchover device to the computer and to configure a first power supply from the computer via the switchover device to the camera; and a second power supply which, in the active state, supplies the camera and, if necessary, the display device with power via the switchover device.

In the method, at least a first switching state a), a second switching state b) and a third switching state c) are effected by the switchover device.

The first switching state a) is effected if the first power supply is inactive and the second power supply is active, wherein, in the first switching state a), the image signal received from the camera via the first interface is transmitted via the second interface to the display device, but not via the third interface to the computer, wherein the display device displays an image defined by the image signal.

The second switching state b) is effected if the first power supply is active and the second power supply is inactive, wherein, in the second switching state b), the image signal received from the camera via the first interface is transmitted via the third interface to the computer, but not via the second interface to the display device.

The third switching state c) is effected if both the first and the second power supply are active, wherein, in the third switching state c), the image signal received from the camera via the first interface is transmitted via the third interface to the computer, but not via the second interface to the display device, wherein the camera is still supplied with power via the switchover device by the second power supply, but not by the first power supply.

Other features which are considered as characteristic for the invention are set forth in the appended claims.

Although the invention is illustrated and described herein as being embodied in camera system for monitoring an installation such as switchgear, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE SEVERAL VIEWS OF THE DRAWING

The drawing figures are shown schematically. Similar or identical elements are denoted with the same reference numerals throughout the figures.

DETAILED DESCRIPTION OF THE INVENTION

Figure 1:
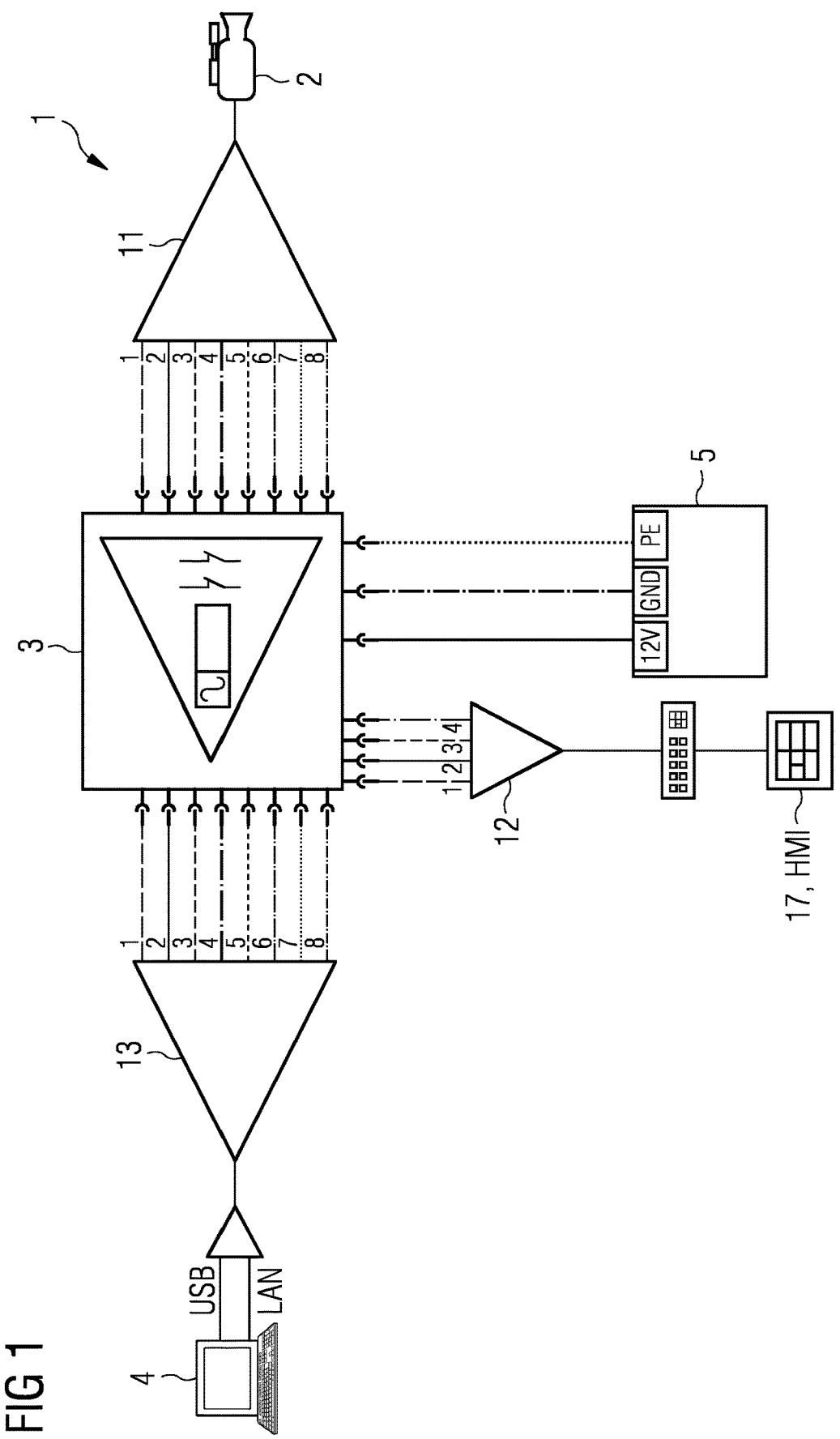
FIG. 1 shows a schematic view of a camera system according to an exemplary embodiment of the invention.

Referring now to the figures of the drawing in detail and first, in particular, to FIG. 1 thereof, there is shown a schematic view of a camera system 1 according to an exemplary embodiment. The camera system 1 serves to monitor an installation, such as a switchgear. The latter may be gas-insulated switchgear, wherein the camera system is used for isolating distance monitoring.

The camera system 1 has at least one camera 2 which generates an image signal, a human-machine interface HMI with a display device, and a switchover device 3 which is connected via a first interface 11 to the camera 2 in order to receive the image signal from the camera 2, and which is connected via a second interface 12 to the human-machine interface HMI in order to transmit the image signal to the human-machine interface HMI.

The camera system 1 further has a third interface 13 which is configured to connect the switchover device 3 to a computer 4. The third interface 13 is configured, in the active state, to transmit the image signal from the switchover device 3 to the computer 4, and to configure a first power supply from the computer 4 via the switchover device 3 to the camera 2. The computer can, for example, be a laptop, a PC, a tablet, a power bank, a charging device, a smartphone or similar which, by way of a USB interface, is capable of providing the first power supply.

In addition, the camera system 1 has a second power supply 5 which, in the active state, supplies the camera 2 and, if necessary, the human-machine interface HMI with power via the switchover device 3.

The switchover device 3 is configured to effect at least a first switching state a), a second switching state b), and a third switching state c).

The switchover device 3 is configured to effect the first switching state a) if the first power supply is inactive and the second power supply 5 is active. In the first switching state a), the image signal received from the camera 2 via the first interface 11 is transmitted only via the second interface 12 to the human-machine interface HMI, but not via the third interface 13 to the computer 4, wherein the human-machine interface HMI displays an image defined by the image signal on the display device.

The switchover device 3 is configured to effect the second switching state b) if the first power supply is active and the second power supply 5 is inactive. In the second switching state b), the image signal received from the camera 2 via the first interface 11 is transmitted only via the third interface 13 to the computer 4, but not via the second interface 12 to the human-machine interface HMI. The second switching state b) takes effect, for example, in an emergency operation if the second voltage supply 5 fails.

The switchover device 3 is configured to effect the third switching state c) if both the first and the second power supply 5 are active. In the third switching state c), the image signal received from the camera 2 via the first interface 11 is transmitted only via the third interface 13 to the computer 4, but not via the second interface 12 to the human-machine interface HMI, wherein the camera 2 is still supplied with power via the switchover device 3 by the second power supply 5, but not by from the first power supply. In the case of the third switching state c), the connected computer 4 has priority for the data connection, but the camera 2 is still supplied by the second power supply 5.

Figure 2:
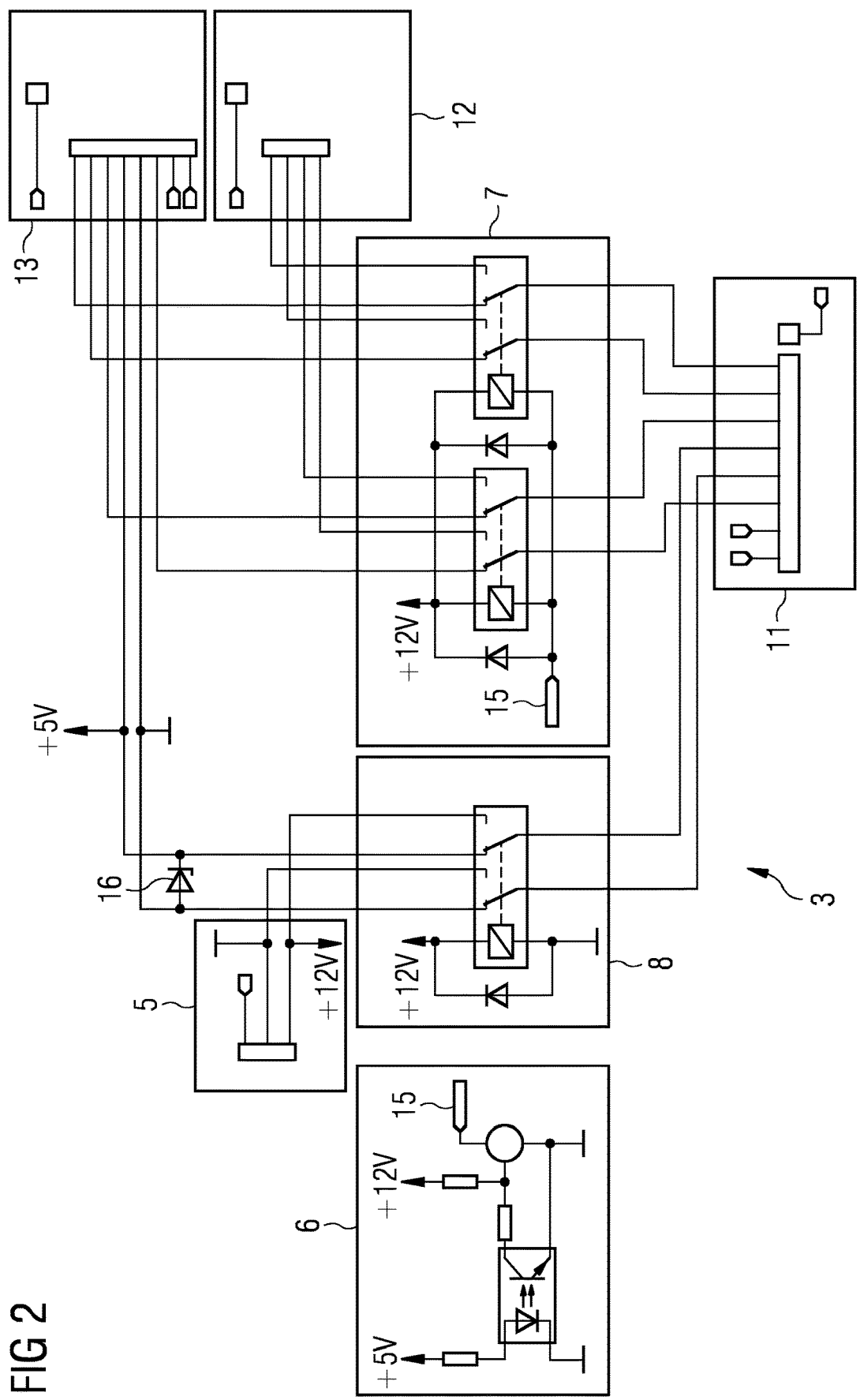
FIG. 2 shows an equivalent circuit diagram of a switchover device and its peripherals according to an exemplary embodiment.

FIG. 2 shows an equivalent circuit diagram of a switchover device 3 and its peripherals according to one exemplary embodiment. The switchover device 3 has a first relay device 7 which is actuated by a logic circuit 6 and is formed, for example, by two relays in each case having four contacts and transmitting the image signal from the first interface 11 to either the second or the third interface 12, 13, and a second relay device 8 which is formed, for example, by one relay with two contacts and which initiates a power supply of the camera 2 by either the first or the second power supply 5.

The logic circuit 6 detects whether the first power supply and the second power supply 5 are active or not. The logic circuit 6 feeds a corresponding logic control signal 15 to coils of the first relay device 7.

The logic circuit 6 is configured to cause the first relay device 7 to transmit the image signal from the first interface 11 to the second interface 12, but not to the third interface 13 if the logic circuit 6 detects that the first power supply is inactive and the second power supply 5 is active, i.e. in the switching state a).

The logic circuit 6 is configured to cause the first relay device 7 to transmit the image signal from the first interface 11 to the third interface 13, but not to the second interface 12 if the logic circuit 6 detects that the first power supply is active, i.e. in the switching state b). This switching state b) is presently shown in FIG. 2.

The second relay device 8 supplies the camera 2 with power via the second power supply 5 and not via the first power supply if it is energized by the active, second power supply 5, that is, in the switching states a) and c).

The second relay device 8 initiates a power supply of the camera 2 via the first power supply and not via the second power supply 5 if it is not energized by the inactive, second power supply 5, that is, in the switching state b).

The switchover device 3 in the exemplary embodiment in FIG. 2 has a total of three relays, i.e., the first relay device 7 having two relays with a total of four contacts to switch over the network connection, and the second relay device 8 having one relay with two contacts to change the voltage supply. The relays are equipped with 12 V coils. In an emergency operation, if the 12 V supply voltage of the second power supply 5 is not available, the relay contacts are in the de-energized position and enable a direct connection between the computer 4 and the camera 2.

The relay of the second relay device 8 for the voltage supply is controlled directly from the 12 V input, since, as soon as 12 V are available, they are also intended to be used to supply the camera 2. Conversely, the data relays of the first relay device 7 are intended to pick up if 12 V are present, but must not pick up if 5V are also applied from the first power supply of the computer 4. For this purpose, the relay coils are controlled by means of a MOSFET as a low-side switch. The gate is connected via an optocoupler with a series resistor to ground, while it is simultaneously connected to 12 V via a 100-fold greater pull-up resistor. Due to this configuration, the MOSFET is conductive only if 12 V, but not 5 V, are applied. In this case, the relay picks up and the data contacts are connected to the switch. A suppressor diode 16 protects the 5V path to the computer 4 in order to ensure that no charged capacitors within the camera 2 feed back an impermissible voltage following the switchover from 12 V to 5V.

The first interface 11 and the third interface 13 can in each case be an RJ45 interface to transmit the image signal with integrated power supply lines for the first power supply.

The third interface 13 can be a Y-cable which has a USB stream, an RJ45 data stream, and a combined USB/RJ45 stream in which lines of the USB stream and the RJ45 data stream are combined. The third interface 13 can establish a power supply from the computer 4 to the camera 2 on one hand and a communication between the computer 4 and the camera 2 on the other hand by means of USB and Ethernet.

The second interface 12 may be an RJ45 interface to transmit the image signal.

The first power supply can have a rated voltage of 5 V which is provided, for example, by a USB connection of the computer 4, and the second power supply 5 can have a rated voltage of 12 V.

Figure 3:
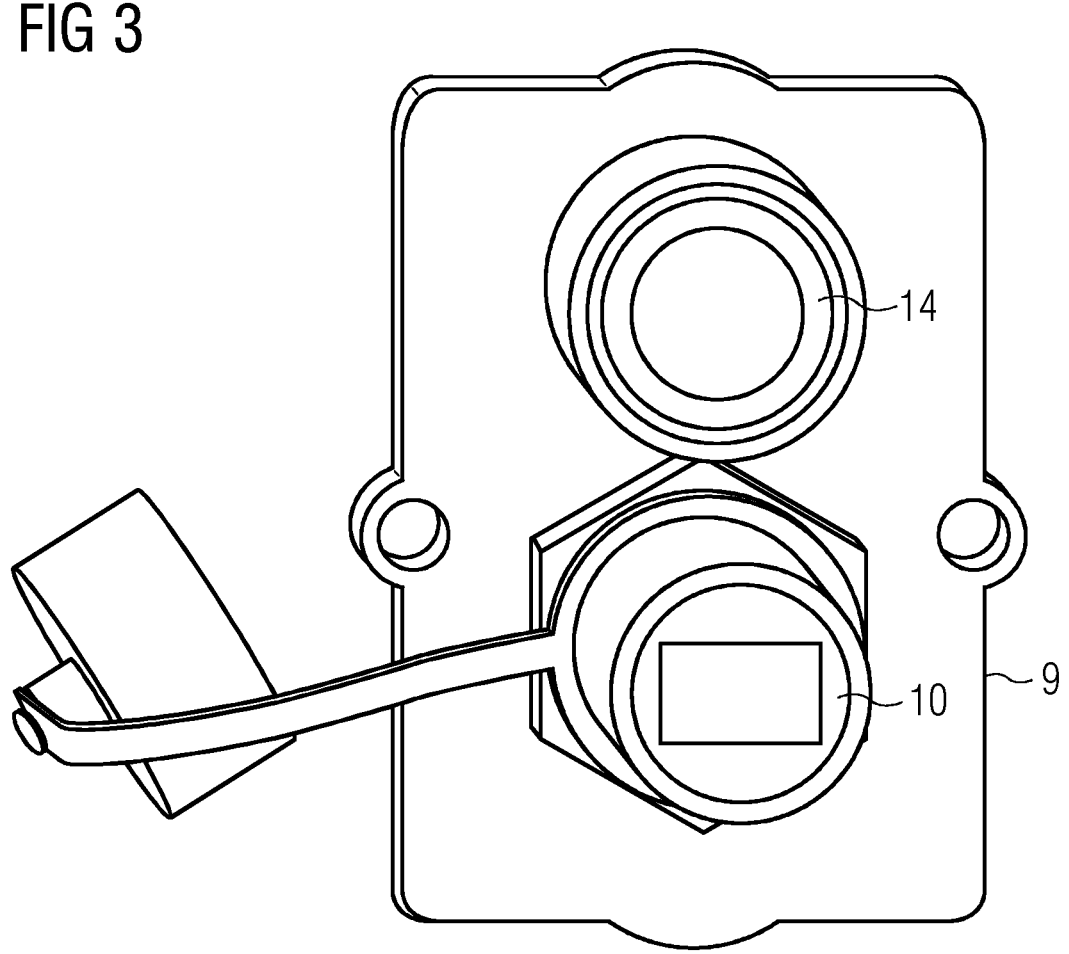
FIG. 3 shows a panel according to an exemplary embodiment.

FIG. 3 shows a panel 9 according to one exemplary embodiment. It is configured for this purpose to be fitted to a housing of the installation. The panel 9 has a socket 10 for the third interface 13 and an illuminated pushbutton or illuminated switch 14 to switch the camera 2 on and off. The socket can be an RJ-45 socket.

The camera system 1 may have a plurality of cameras 2 and a plurality of panels 9, wherein the respective illuminated pushbuttons/illuminated switches 14 of the panels 9 can be configured to uniquely identify an associated camera 2. As well as switching the required camera 2 on and off, the illuminated pushbutton/illuminated switch 14 is also used accordingly for the unique identification of this camera 2, since a multiplicity of cameras 2 or VDMS systems can be accessed via the human-machine interface HMI.

The exemplary embodiments shown can be modified as follows: instead of the relay devices, comparable electronic components such as transistors, multiplexers, etc., could be used. An alternative solution of this type can be supplemented with a step-up converter which counteracts voltage drop problems.

It should be noted that the term "have" does not exclude other elements or steps. Elements which are described in connection with different embodiments can also be combined.

The following is a summary list of reference numerals and the corresponding structure used in the above description of the invention:

1 Camera system
2 Camera
3 Switchover device
4 Computer
5 Second power supply
6 Logic circuit
7 First relay device
8 Second relay device
9 Panel
10 Socket
11 First interface
12 Second interface
13 Third interface
14 Illuminated pushbutton/illuminated switch
15 Logic control signal
16 Suppressor diode
17 Display device

The invention claimed is:

1. A camera system for monitoring an installation, the camera system comprising:
    a camera configured to generate an image signal;
    a display device;
    a first interface, a second interface, and a third interface;
    a switchover device connected via said first interface to said camera for receiving the image signal from said camera and connected via said second interface to said display device for transmitting the image signal to said display device;
    said third interface being configured for connecting said switchover device to a computer and, in an active state thereof, to transmit the image signal from said switchover device to the computer, and to configure a first power supply from the computer via said switchover device to provide power to said camera; and
    a second power supply which, in an active state thereof, supplies said camera with power via said switchover device;
    said switchover device being configured to assume a first switching state a), a second switching state b), and a third switching state c), wherein:
    said switchover device is configured to effect the first switching state a) if said first power supply is inactive and said second power supply is active, wherein, in the first switching state a), the image signal received from said camera via said first interface is transmitted via said second interface to said display device, but not to said third interface, and said display device displays an image defined by the image signal;
    said switchover device is configured to effect the second switching state b) if said first power supply is active to power said camera and said second power supply is inactive, wherein, in the second switching state b), the image signal received from said camera via said first interface is transmitted to said third interface, but not via said second interface to said display device; and said switchover device is configured to effect the third switching state c) if both said first power supply and said second power supply are active, wherein, in the third switching state c), the image signal received from said camera via said first interface is transmitted to said third interface, but not via said second interface to said display device, and said camera is still supplied with power via said switchover device from said second power supply but not by said first power supply.

2. The camera system according to claim 1, wherein:

said switchover device has a first relay device which is actuated by a logic circuit and transmits the image signal from said first interface to either said second interface or said third interface, and a second relay device which initiates a power supply for said camera from either said first power supply or said second power supply;

said logic circuit is configured to detect whether or not said first power supply and the second power supply are active;

said logic circuit is configured to cause said first relay device to transmit the image signal from said first interface to said second interface, but not to said third interface, when said logic circuit detects that said first power supply is inactive and said second power supply is active; and said logic circuit is configured to cause said first relay device to transmit the image signal from said first interface to said third interface, but not to said second interface, when said logic circuit detects that said first power supply is active;

said second relay device supplies said camera with power via said first power supply if said second relay device is excited by the active, said second power supply; and said second relay device initiates the power supply of said camera from said first power supply and not from said second power supply when said second relay device is not energized by the inactive, said second power supply.

3. The camera system according to claim 1, wherein each of said first interface and said third interface is an RJ45 interface to transmit the image signal with integrated power supply lines for said first power supply.

4. The camera system according to claim 1, wherein said third interface has a USB stream, an RJ45 data stream and a combined RJ45 stream in which lines of the USB stream and the RJ45 data stream are combined.

5. The camera system according to claim 4, wherein said third interface is a Y-cable.

6. The camera system according to claim 1, wherein said second interface is an RJ45 interface configured to transmit the image signal.

7. The camera system according to claim 1, wherein said first power supply has a rated voltage of 5 V and/or said second power supply has a rated voltage of 12 V.

8. The camera system according to claim 1, further comprising a panel configured for attachment to a housing of the installation, said panel having a socket forming a part of said third interface and an illuminated pushbutton for switching said camera on and off.

9. The camera system according to claim 1, further comprising a panel configured for attachment to a housing of the installation, said panel having a socket forming a part of said third interface and an illuminated switch for switching said camera on and off.

10. The camera system according to claim 9, wherein:
said camera is one of a plurality of cameras; and
said panel is one of a plurality of panels; and
respective said switches of said panels are configured to uniquely identify or display an associated said camera.

11. The camera system according to claim 1, further comprising a third power supply forming an alternative 5 V voltage source as an alternative to said first power supply.

12. The camera system according to claim 11, wherein said third power supply is power bank, a charging device, or a tablet.

13. The camera system according to claim 1, further comprising a human-machine interface or a second computer having said display device.

14. The camera system according to claim 1 configured for monitoring switchgear.

15. The camera system according to claim 14, wherein said display device forms a part of a computer which belongs to a control station and is located at a distance from the switchgear.

16. The camera system according to claim 14, wherein said display device forms a part of a computer which belongs to a remote control station of the installation.

17. A method for monitoring an installation, the method which comprises:

providing a camera system having at least one camera which generates an image signal; a switchover device which is connected via a first interface to the camera in order to receive the image signal from the camera and which is connected via a second interface to a display device in order to transmit the image signal to the display device; a third interface which is configured to connect the switchover device to a computer, wherein the third interface is configured, in an active state, to transmit the image signal from the switchover device to the computer and to provide power from a first power supply from the computer via the switchover device to the camera; and a second power supply which, in an active state, supplies the camera with power via the switchover device;

selectively effecting with the switchover device at least a first switching state a), a second switching state b), or a third switching state c), and thereby:

effecting the first switching state a) when the first power supply is inactive and the second power supply is active, wherein, in the first switching state a), the image signal received from the camera via the first interface is transmitted via the second interface to the display device, but not via the third interface to the computer, wherein the display device displays an image defined by the image signal;

effecting the second switching state b) when the first power supply is active to power the camera and the second power supply is inactive, wherein, in the second switching state b), the image signal received from the camera via the first interface is transmitted via the third interface to the computer, but not via the second interface to the display device; and effecting the third switching state c) when both the first and the second power supply are active, wherein, in the third switching state c), the image signal received from the camera via the first interface is transmitted via the third interface to the computer, but not via the second interface to the display device, wherein the camera is still supplied with power via the switchover device by the second power supply, but not by the first power supply.

18. The method according to claim 17 configured for monitoring a switchgear installation.

\* \* \* \* \*